April 12, 1927.  G. C. MONCKMEIER  1,624,499

WEAR COMPENSATING BOLT

Original Filed May 14, 1924

Witness:
G. Burkhardt

Inventor:
Gustav C. Monckmeier,
By Cromwell, Priest & Warden
Attys.

Patented Apr. 12, 1927.

1,624,499

UNITED STATES PATENT OFFICE.

GUSTAV C. MONCKMEIER, OF CHICAGO, ILLINOIS.

WEAR-COMPENSATING BOLT.

Original application filed May 14, 1924, Serial No. 713,151. Divided and this application filed March 12, 1926. Serial No. 94,136.

This invention has to do with wear compensating bolts of the type wherein the spring which is used to advance the nut along the bolt is secured at one end to a washer on the bolt.

The object of the invention is to provide an improved connection between the washer and the bolt for holding the former against rotation on the latter.

Other objects and advantages will be apparent upon an understanding of the construction, arrangement and operation of a bolt embodying the connection of the invention.

One form of the connection is herein disclosed, but it will be understood that such form is presented merely for the purpose of exemplification as the connection is quite obviously susceptible of embodiment in other modified forms coming equally within the scope of the invention as defined in the claims.

Figure 1:
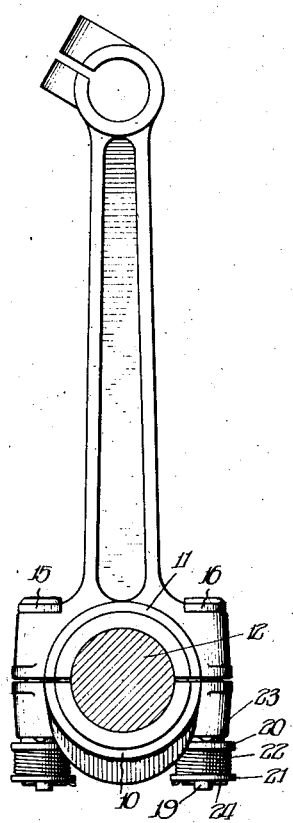
Fig. 1 is a side view of a connecting rod which is equipped with two of the wear compensating bolts of the invention.
Figure 2:
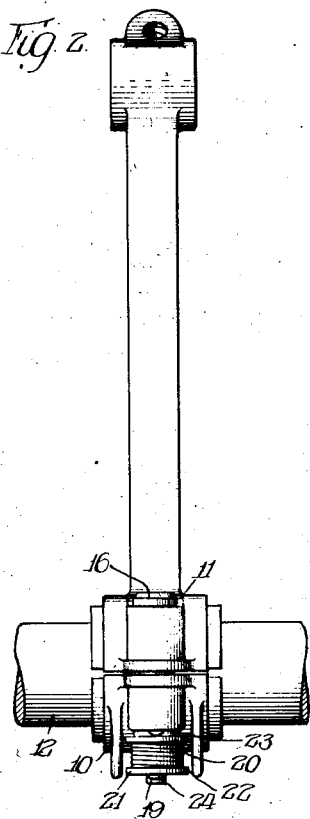
Fig. 2 is a different side view of the rod.
Figure 3:
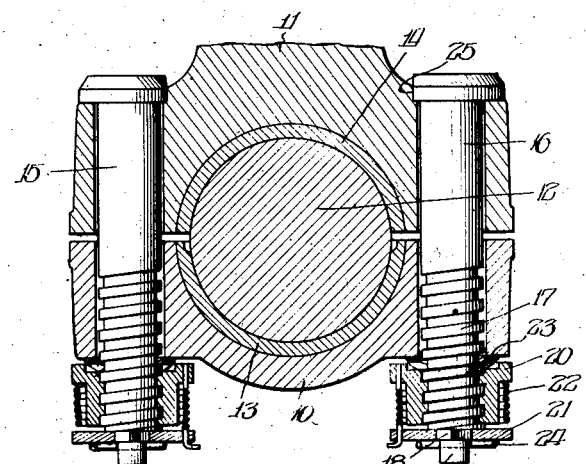
Fig. 3 is an enlarged sectional view through the rod, showing the bolts in detail.

The connecting rod illustrated in the drawing is provided with a detachable cap 10 which cooperates with the lower end 11 of the rod to form a cylindrical bearing for a journal 12. The parts 10 and 11 of the rod are lined with semi-cylindrical bushings 13 and 14 which bear directly against the journal, and the bushings are so proportioned as to hold those portions of the parts which are at opposite sides of the journal in slightly spaced relation to each other whereby to allow for contraction of the parts as wear occurs between the bushings and the journal. The parts 10 and 11 are held together by two bolts 15 and 16 which pass through aligned apertures therein. The bolts are duplicates of each other and only one therefore need be described.

The bolt 16 differs from other bolts used for the purpose of wear compensation in that it is provided, beyond the threaded shank portion 17, with a squared shank portion 18, and, beyond the squared portion 18 with a rounded shank portion 19. The bolt has in association therewith a nut 20, a washer 21, a torsion spring 22 and a resiliently yieldable member 23. The nut 20 has a threaded bore for screw engagement with the threaded portion 17 of the bolt; the washer 21 has a squared bore for non-rotatable engagement with the squared portion 18 and non-rotatable engagement with the rounded portion 19; the torsion spring 22 is secured at its opposite ends to the nut and the washer; and the resiliently yieldable member 23 is positioned between the nut and the part 10. A cotter pin 24 passes through the rounded portion 19 of the bolt 16, and serves to prevent the washer from moving out of locked engagement with the squared portion 18.

The spring 22, when tensioned by the washer, tends to advance the nut helically along the threaded portion of the bolt, and serves to compensate for wear in the bearing by taking up with the nut the looseness which would otherwise develop between the part 10 and the nut as the result of such wear. The member 23 normally maintains a small amount of clearance between the part 10 and the nut, and serves to permit a correspondingly limited amount of retraction of the parts 10 and 11 away from each other irrespective of the nut to compensate for such conditions as are caused by journals which are temporarily expanded under heat or journals which have become out-of-round through wear.

In service, the bolt is positioned in the aligned apertures in the parts 10 and 11, and is held against turning therein by a flattened face 25 on the otherwise rounded head of the bolt which fits contiguously against a flattened shoulder on the part 11. The member 23 is placed on the upper face of the nut 20, or on the threaded portion 17 of the bolt, and the nut is screwed along the threaded portion into a position wherein the nut, acting through the member, holds the parts 10 and 11 snugly against the journal 12. The washer 21 is rotated on the rounded portion 19 of the bolt until the desired amount of tension has been stored up in the spring, and then the washer is shifted from the rounded portion onto the squared portion 18 and locked against rotation by the squared portion.

This application is a division of my copending application Serial No. 713,151, filed May 14, 1924, which application matured into Patent No. 1,585,309, dated May 18, 1926.

I claim:

1. In a device of the class described, the combination of a bolt having an extension on its threaded end, the inner portion of the extension being angular in cross section and the outer portion being circular in cross section, a nut, a washer, and a spring having one end connected to the nut and the other end to the washer for automatically advancing the nut on the bolt, the washer being adapted to be turned on the outer portion of the extension to place the spring under stress and then seated and held against movement on the inner portion of the extension.

2. In a device of the class described, a bolt having a threaded portion, a non-circular portion beyond the threaded portion, and a circular portion beyond the non-circular portion, a nut positioned on the threaded portion, a washer positioned on the non-circular portion and having a non-circular bore which will rotate on the circular portion but will interfit with the non-circular portion, and a coil spring secured at its opposite ends to the nut and washer.

3. In a device of the class described, a bolt having a threaded portion, a non-circular portion beyond the threaded portion and a circular portion beyond the non-circular portion, a nut positioned on the threaded portion, a washer positioned on the non-circular portion and having a non-circular bore which will rotate on the circular portion but will interfit with the non-circular portion, a coil spring secured at its opposite ends to the nut and washer, and a cotter pin passing through a transverse aperture in the circular portion for holding the washer in position on the non-circular portion after it has been rotated on the circular portion to tension the spring.

4. In a device of the class described, a bolt having a threaded portion, a washer-locking portion beyond the threaded portion, and a washer-journalling portion beyond the washer-locking portion, a nut positioned on the threaded portion, a washer positioned on the washer-locking portion and having a bore which will rotate on the journalling portion but is so shaped as to lock against rotation on the washer-locking portion, and a coil spring secured at its opposite ends to the nut and washer.

5. In a device of the class described, a bolt having a threaded portion, a washer-locking portion beyond the threaded portion, and a washer-journalling portion beyond the washer-locking portion, a nut positioned on the threaded portion, a washer positioned on the washer-locking portion and having a bore which will rotate on the journalling portion but is so shaped as to lock against rotation on the washer-locking portion, and a coil spring secured at its opposite ends to the nut and washer, said washer-journalling portion being transversely apertured for the reception of a cotter pin.

In testimony whereof I have hereunto subscribed my name.

GUSTAV C. MONCKMEIER.